US012668473B2

(12) United States Patent
Choi

(10) Patent No.: US 12,668,473 B2
(45) Date of Patent: Jun. 30, 2026

(54) CONTAINER TRANSPORT SYSTEM AND CONTAINER TRANSPORT METHOD USING THE SAME

(71) Applicant: Henry Choi, Cupertino, CA (US)

(72) Inventor: Henry Choi, Cupertino, CA (US)

( * ) Notice: Subject to any disclaimer, the term of this patent is extended or adjusted under 35 U.S.C. 154(b) by 312 days.

(21) Appl. No.: 18/429,306

(22) Filed: Jan. 31, 2024

(65) Prior Publication Data

US 2024/0166483 A1 May 23, 2024

Related U.S. Application Data

(63) Continuation of application No. PCT/KR2022/013425, filed on Sep. 7, 2022.

(30) Foreign Application Priority Data

Sep. 9, 2021 (KR) ........................ 10-2021-0120654
Sep. 2, 2022 (KR) ........................ 10-2022-0111613

(51) Int. Cl.
*B66F 9/18* (2006.01)
*B66F 9/06* (2006.01)

(52) U.S. Cl.
CPC ................ *B66F 9/18* (2013.01); *B66F 9/063* (2013.01)

(58) Field of Classification Search
CPC ........ B66F 9/18; B66F 9/063; B65D 90/0033; B60P 1/64; B65G 63/00; B61J 3/00
See application file for complete search history.

(56) References Cited

U.S. PATENT DOCUMENTS

| | | | | |
|---|---|---|---|---|
| 7,270,201 | B1 | 9/2007 | Cryer | |
| 12,162,544 | B2 * | 12/2024 | Clauer | B62D 53/08 |
| 2011/0107938 | A1 | 5/2011 | Weidemann et al. | |
| 2019/0039826 | A1 * | 2/2019 | Luckinbill | B25J 9/0084 |
| 2019/0337342 | A1 | 11/2019 | Genheimer et al. | |
| 2020/0055357 | A1 | 2/2020 | Laine | |
| 2024/0166274 | A1 * | 5/2024 | Choi | B62D 49/007 |

FOREIGN PATENT DOCUMENTS

| | | | |
|---|---|---|---|
| JP | 2020-515453 | A | 5/2020 |
| WO | 2014-131624 | A1 | 9/2014 |

OTHER PUBLICATIONS

International Search Report of PCT/KR2022/013425 mailed Dec. 21, 2022.

* cited by examiner

*Primary Examiner* — Saul Rodriguez
(74) *Attorney, Agent, or Firm* — Revolution IP, PLLC

(57) ABSTRACT

A container transportation system using autonomous driving includes: a container to be transported; at least two transport vehicles docked with or undocked from the container and transporting the container; and a management server controlling travelling of the transport vehicles, wherein the transport vehicle includes: a transport vehicle body; and a container coupling part formed at an upper portion of the transport vehicle body and coupled to the container, and the container includes: a container body; a plurality of height adjustment pillars coupled to respective corners of a lower surface of the container body and adjustable in length to lift or lower the container body from or to the ground; and a vehicle coupling part formed on the lower surface of the container body and coupled to the container coupling part.

5 Claims, 11 Drawing Sheets

S300a (a)

(b)

(a)

(b)

S300C (a)

(b)

CONTAINER TRANSPORT SYSTEM AND CONTAINER TRANSPORT METHOD USING THE SAME

CROSS REFERENCE TO RELATED APPLICATIONS

This application is a Continuation of PCT International Patent Application No. PCT/KR2022/013425 filed on Sep. 7, 2022, which claims priority to Korean Patent Application Nos. 10-2021-0120654 filed on Sep. 9, 2021 and 10-2022-0111613 filed on Sep. 2, 2022 which are all hereby incorporated by reference in their entirety.

BACKGROUND OF THE INVENTION

The present invention relates to a container transportation system and a container transportation method using the same and, more particularly, to a container transportation system in which a transport vehicle automatically docks with a container and autonomously travels to transport the container to a transport destination, and a container transportation method using the same.

Leisure travel by car has been popular in the United States, which has a large landmass, and in Europe, where neighboring countries can be reached by land. Recently, with increase in interest in camping in Korea, long-term car trips have been carried out using campers equipped with various living facilities.

Besides campers, leisure travel by car uses a house car, which is a car having an interior designed for human habitation, a house trailer, which is a trailer that can be pulled by a car and is equipped with living facilities, and a camping truck, which is a truck having a living cabin on an undercarriage thereof.

Most such trailers have at least one set of wheels. In the case of a trailer having one set of wheels, a vehicle docks with the wheel-less side of a trailer to transport the trailer. In the case of a trailer having two sets of wheels, a separate docking device is provided to one side of the trailer such that a vehicle is docked therewith to pull or transport the trailer.

In the case of using a house trailer, in order for the towing vehicle to pull the trailer, a person needs to manually couple the vehicle to the trailer using separate couplers formed at the rear side of the vehicle.

In order to solve this problem, there has been proposed a technique in which an unmanned transport vehicle is docked with an underside of a container to transport the container. However, as the length of a container increases, the number of transport vehicles docked with the container also increases and thus possible docking locations of the container with respect to the transport vehicle can be limited.

SUMMARY OF THE INVENTION

The present invention has been conceived to solve such problems in the art and it is an object of the present invention to provide a container transportation system that includes a liftable container to be transported, a transport vehicle docked with or undocked from the container and transporting the container, and a management server controlling travelling of the transport vehicle so as to increase efficiency in delivery of goods, and a container transportation method using the same.

The present invention is not limited thereto and other objects of the present invention will become apparent to those skilled in the art from the following description in conjunction with the accompanying drawings.

In accordance with one aspect of the present invention, there is provided a container transportation system using autonomous driving, including: a container to be transported; at least two transport vehicles docked with or undocked from the container and transporting the container; and a management server controlling travelling of the transport vehicles, wherein the transport vehicle includes: a transport vehicle body; and a container coupling part formed at an upper portion of the transport vehicle body and coupled to the container, and the container includes: a container body; a plurality of height adjustment pillars coupled to respective corners of a lower surface of the container body and adjustable in length to lift or lower the container body from or to the ground; and a vehicle coupling part formed on the lower surface of the container body and coupled to the container coupling part.

The transport vehicle body may have an isosceles trapezoidal shape and the transport vehicle may enter under the container with a narrower side of the transport vehicle body facing the container.

In accordance with one aspect of the present invention, there is provided a container transportation method using the container transportation system, including: a container lifting step in which the container is lifted from the ground; a docking step in which the at least two transport vehicles enter under the container and are coupled to the container; a transport step in which the at least two transport vehicles transport the container; and an undocking step in which the at least two transport vehicles are uncoupled from the container and exit from under the container.

Each of the transport vehicles may include a transport vehicle body having an isosceles trapezoidal shape and, in the docking step, at least two transport vehicles may enter under the container with a narrower side of the transport vehicle body facing the container.

The container transportation system using autonomous driving and the container transportation method using autonomous driving according to the present invention provide the following effects.

First, since the autonomous vehicle automatically docks with the container and autonomously travels to transport the container to a transport destination, high haulage costs in transportation can be saved, thereby providing an economic benefit.

Second, since the autonomous vehicle moves to a location at which the container is stored based on the transport information and the vehicle body is automatically coupled to the container body through insertion of the container coupling part of the autonomous vehicle into the vehicle coupling part of the container, the cost associated with coupling a transportation vehicle to a container can be reduced by elimination of the need for a crane to mount the container on the transportation vehicle, thereby providing an economic benefit.

Third, since the autonomous vehicle moves to a location at which the container is stored based on the transport information and the vehicle body is automatically coupled to the container body through insertion of the container coupling part of the autonomous vehicle into the vehicle coupling part of the container, the time spent on manually coupling a transportation vehicle to a container can be saved, thereby ensuring fast delivery of goods.

Fourth, the transport vehicle can be aligned with the container based on recognition of a docking location using a sensor thereof without the help of external equipment, thereby enabling convenient docking in a narrow space.

Fifth, since a sensor mount sensing a transport route of the transport vehicle is configured to be foldable with respect to the transport vehicle, it is possible to prevent collision between the container and a sensor unit during docking of the transport vehicle with the container.

Sixth, since a cushioning part is disposed between an upper surface of the transport vehicle body and the container coupling part, it is possible to provide cushioning between the transport vehicle and the container during coupling of the transport vehicle to the container or during travelling of the transport vehicle, thereby ensuring vibration reduction and docking stability.

Seventh, since an upper surface of a docking body is formed in a curved shape such that the docking body gradually decreases in thickness toward an end thereof, it is possible to facilitate vertical alignment of the docking body during coupling of the transport vehicle to the container.

The present invention is not limited thereto and other advantageous effects of the present invention will become apparent to those skilled in the art from the appended claims.

DETAILED DESCRIPTION OF THE INVENTION

Figure 1:
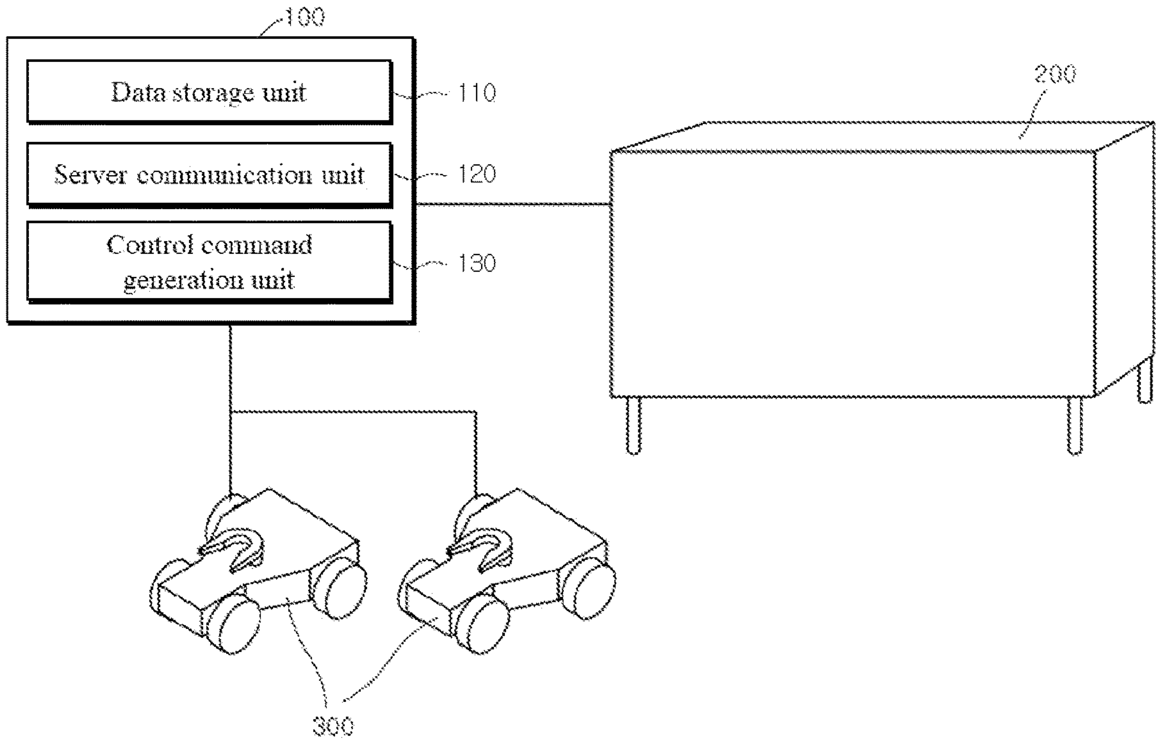
FIG. 1 is an overall diagram of a container transportation system according to the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims Like components will be denoted by like reference numerals throughout the specification.

It should be noted that the drawings are not to precise scale and may be exaggerated in shape and size of components for descriptive convenience and clarity only. In addition, it should be noted that the same components may be denoted by the same reference numerals throughout the specification. Descriptions of known functions and constructions which may unnecessarily obscure the subject matter of the present invention will be omitted.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

It will be understood that when an element is referred to as being "connected" to or "on" another element, it can be directly on the other element, or intervening elements may also be present. In contrast, when an element is referred to as being "directly connected" to or "directly on" another element, there are no intervening elements present. The same is applied to other expressions for describing a relationship between elements.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Spatially relative terms, such as "upper end," "lower end," "upper surface," "lower surface," "upper portion," "lower portion," and the like, may be used to distinguish the relative positions of components. Although a component on the upper side of the drawing is referred to as an "upper component" and a component on the lower side of the drawing is referred to as a "lower component", this is for convenience only and the upper component may be referred to as the lower component, and vice versa, without departing from the scope of the present invention.

Hereinafter, a container transportation system and a container transportation method using the same according to embodiments of the present invention will be described with reference to the accompanying drawings.

A vertical direction in FIG. 1 to FIG. 12 refers to an upward/downward direction, and a horizontal direction in FIG. 1 to FIG. 12 refers to a frontal (forward/rearward) direction and a lateral (leftward/rightward) direction.

Figure 2:
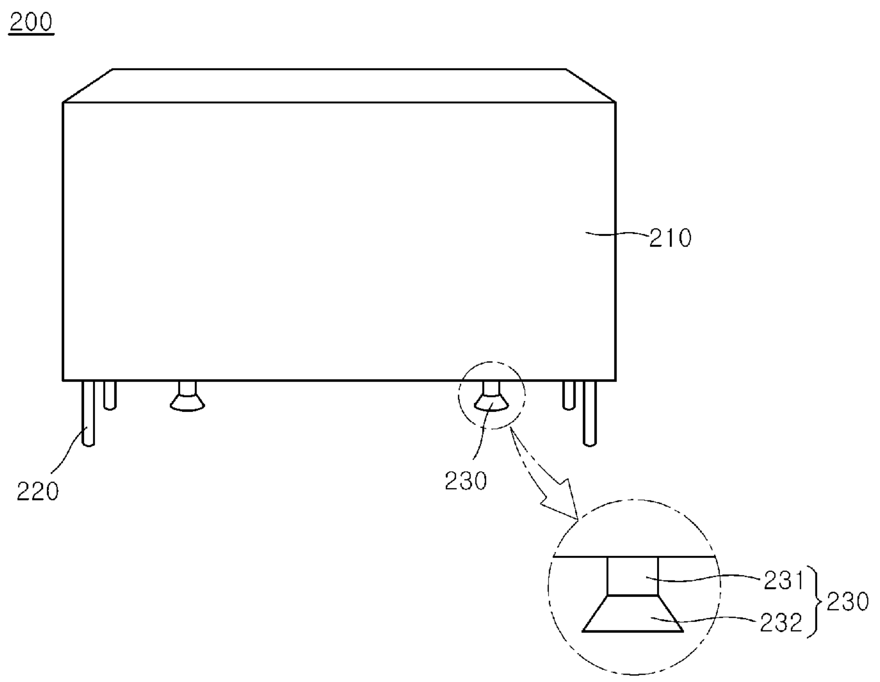
FIG. 2 is a schematic view of a container of the container transportation system according to the present invention.
Figure 3:
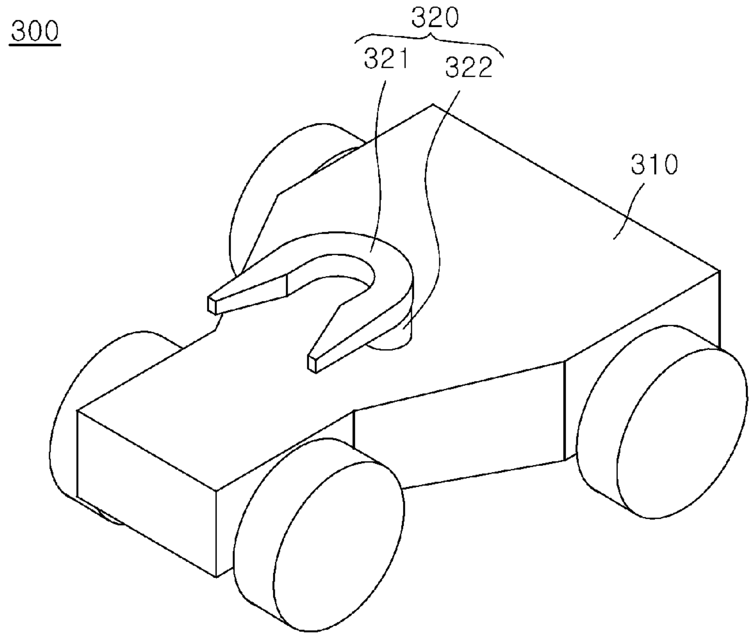
FIG. 3 is a schematic view of a transport vehicle of the container transportation system according to the present invention.

FIG. 1 is an overall diagram of a container transportation system according to the present invention, FIG. 2 is a schematic view of a container 200 of the container transportation system according to the present invention, and FIG. 3 is a schematic view of a transport vehicle 300 of the container transportation system according to the present invention.

Referring to FIG. 1 to FIG. 3, the container transportation system according to the present invention includes a management server 100, a container 200, and a transport vehicle 300.

The management server 100 stores server data for controlling travelling of the transport vehicle 300 and operating the container 200 to control travelling of the transport vehicle 300 and operate the container 200. Specifically, the management server 100 includes a data storage unit 110, a server communication unit 120, and a control command generation unit 130.

The data storage unit 110 stores server data for controlling travelling of the transport vehicle 300 and operating the container 200, wherein the server data includes container transport information, container weight information, and code information attached to the container 200 and the transport vehicle 300 (a vehicle code and a container code described below).

The container transport information includes a storage location at which the container 200 to be transported is stored, a transport destination to which the container 200 is to be transported, a transport completion time by which the container 200 is to be transported to the transport destination, and an estimated transport time for the container 200 from the storage location to the transport destination.

The container weight information is information about an actual weight of the container 200 according to the weight of loads stored in the container 200.

The code information includes information about a container code unique to the container 200 to be transported and a vehicle code unique to the autonomous vehicle 300 responsible for transporting the container 200.

The container 200 is transported from the storage location to the transport destination by the transportation vehicle 300. Specifically, the container 200 includes a container body 210, a container code (not shown), a height adjustment pillar 220, a pillar length adjustment unit (not shown), a vehicle coupling part 230, and a container communication unit (not shown). In the following, the container 200 will be described in detail with reference to FIG. 1 and FIG. 2.

The container body 210 has an inner space in which loads are loaded, and the container code is attached to an outer side of the container body 210. Specifically, the container code includes a container identification code and a container position code.

The container identification code is a code attached to the container body 210 to identify whether the container 200 is a target container 200 to be transported by the transport vehicle 300, and is disposed on a side surface of the container body 210.

The container position code is a code guiding a position of the vehicle coupling part 230 to allow a container coupling part 320 of the transport vehicle 300 to be aligned with the vehicle coupling part 230, and is disposed on an underside of the container body 210.

The height adjustment pillar 220 is coupled to an edge of a lower surface of the container body 210 and is adjustable in length to move the container body 210 up (or down) from (or to) the ground.

The pillar length adjustment unit adjusts the length of the height adjustment pillar 220 in response to a command from the management server 100.

The vehicle coupling part 230 is formed at a center of the lower surface of the container body 210 and allows the container coupling part 320 to be inserted thereinto and coupled thereto. The vehicle coupling part 230 is provided in number corresponding to the number of transport vehicles 300. Specifically, the vehicle coupling part 230 includes a locking piece 231 and a disc 232.

The locking piece 231 may have a cylindrical shape or a prismatic shape, and is vertically coupled to the lower surface the container body 210.

The disc 232 protrudes from a lower end of the locking piece 231 and has a greater width than the locking piece 231 in cross-section such that a container coupling part 320 described below can be prevented from being decoupled from the locking piece 231 due to vertical movement of the container 200 or the transport vehicle 300 after the container coupling part 320 is docked with the locking piece 231.

The transport vehicle 300 is docked with or undocked from the container 200, and may include at least two transport vehicles 300. The transport vehicle 300 includes a transport vehicle body 310, a container coupling part 320, a vehicle code (not shown), a container code recognition unit (not shown), and a vehicle communication unit (not shown). In the following, the transport vehicle 300 will be described in detail with reference to FIG. 3.

The transport vehicle body 310 of the transport vehicle 300 is adapted to allow the container 200 to be placed on an upper surface thereof and supports the container 200 during transportation of the container 300 to the transport destination.

Here, the upper surface of the transport vehicle body 310 is formed in a planar shape to secure a large contact area between the upper surface of the transport vehicle body 310 and the lower surface of the container 200 upon placement of the container 200 on the upper surface of the transport vehicle body 310 and to allow the container 200 to remain balanced during transport.

The transport vehicle body 310 has an isosceles trapezoidal shape, wherein the transport vehicle may enter under the container 200 with a narrower side of the transport vehicle body 310 facing the container 200.

The container coupling part 320 protrudes from the upper surface of each transport vehicle body 210 and is coupled to the vehicle coupling part 230. Detailed description of the container coupling part 320 will be given further below.

The vehicle code stores unique information (identity) for each transport vehicle body 310. Each vehicle body 310 has a different vehicle code attached thereto.

The container code recognition unit recognizes a container code 320 attached to the container 300 to be transported, which will be described further below along with description of the container 200.

The vehicle communication unit communicates with the server communication unit 120 to receive the server data from the server communication unit 120 to enable the transport vehicle body 310 to transport the container 200 from the storage location to the transport destination.

In addition, the vehicle communication unit transmits pairing status information of the transport vehicle body 310 and container code recognition information to the server communication unit 120.

Figure 4:
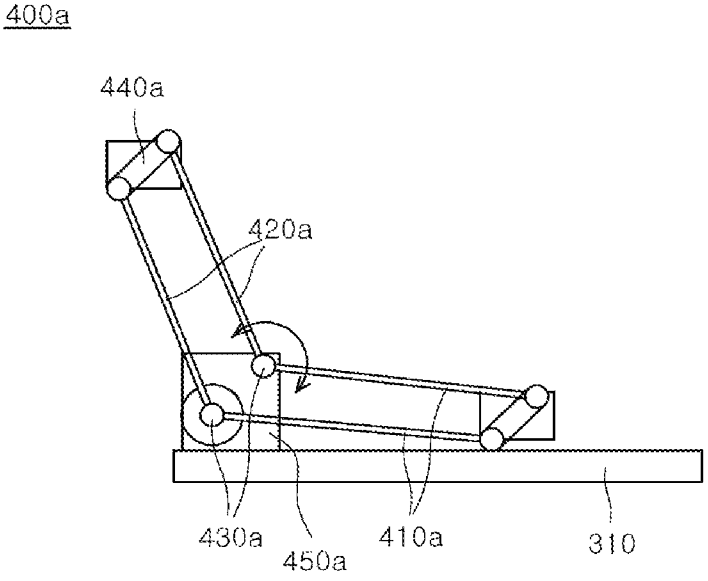
FIG. 4 is a schematic view of a sensor mount of the container transportation system according to the present invention.
Figure 4:
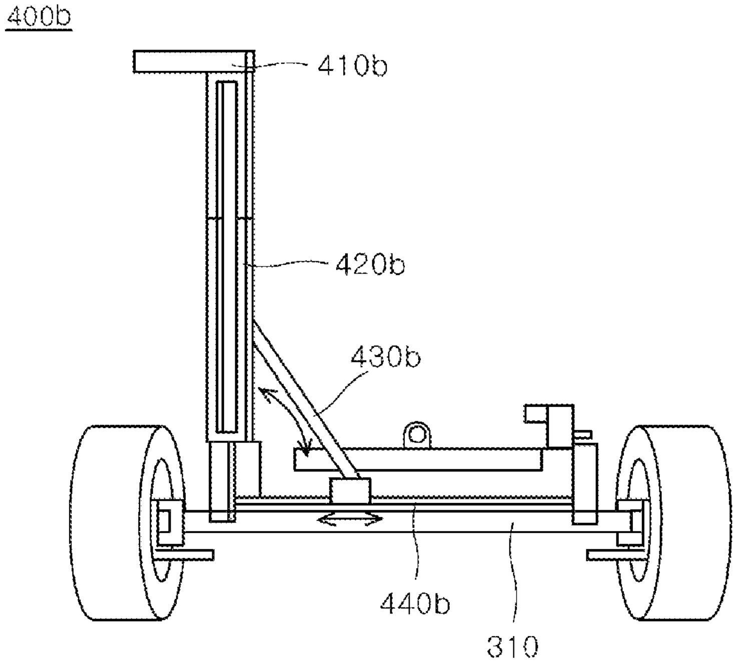

The container transportation system according to the present invention may further include a sensor mount. FIG. 4 is a schematic view of the sensor mount of the container transportation system according to the present invention.

Referring to FIG. 4(*a*), a sensor mount 400*a* according to one embodiment is coupled to the upper surface of the transport vehicle body 310 to sense a transport route of the transport vehicle body 310. Specifically, the sensor mount 400*a* may include a mounting base 410*a*, a folding portion 420*a*, a hinge 430*a*, a sensor unit 440*a*, and a motor 450*a*.

The mounting base 410*a* is coupled to the upper surface of the transport vehicle body 310, and the folding portion 420*a* has one end foldably coupled to an end of the mounting base 410*a*.

The hinge 430*a* is formed in a region connecting the mounting base 410*a* to the folding portion 420*a* to allow the folding portion 420*a* to be adjustable in angle with respect to the mounting base 410*a* such that the mounting base 410*a* and the folding portion 420*a* form a foldable structure.

The sensor unit 440*a* is coupled to the other end of the folding portion 420*a*, and may be disposed on a relatively wide side among the front and rear sides of the transport vehicle body 310. The sensor unit 440*a* may include multiple sensors such as a camera, a lidar sensor, and the like.

The motor 450*a* rotates the hinge 430*a* to adjust a position of the folding portion 420*a* such that the folding portion 420*a* is folded or unfolded with respect to the mounting base 410*a* depending on the direction of rotation of the hinge 430*a*. When the transport vehicle 300 is completely under the container 200, the folding portion 420*a* may be folded parallel to the lower surface of the container 200.

Referring to FIG. 4(*b*), a sensor mount 400*b* according to another embodiment is coupled to the upper surface of the transport vehicle body 310 to sense a transport route of the transport vehicle body 310. Specifically, the sensor mount 400*b* includes a sensor array 410*b*, a support 420*b*, a foldable bar 430*b*, and a lead screw 440*b*.

Since the sensor array 410*b* corresponds to the sensor unit 440*a* of the sensor mount 400*a* described above, description thereof will be omitted.

The support 420*b* has one end connected to the upper surface of the transport vehicle body 310 and the other end coupled to the sensor array 410*b* and is folded on or unfolded from the transport vehicle body 310 by the foldable bar 430*b* described below.

The foldable bar 430*b* has one end connected to the support 420*b* such that the support 420*b* is folded on or unfolded from the transport vehicle body 310 in conjunction with movement of the foldable bar 430*b*.

The lead screw 440*b* is connected to the other end of the foldable bar 430*b* and is driven by a separate drive motor (corresponding to the motor 450*a* of the sensor mount 400*a* described above) to move the foldable bar 430*b* such that the other end of the foldable bar 430*b* is moved in a reciprocating manner on the upper surface of the transport vehicle body 310.

Figure 5:
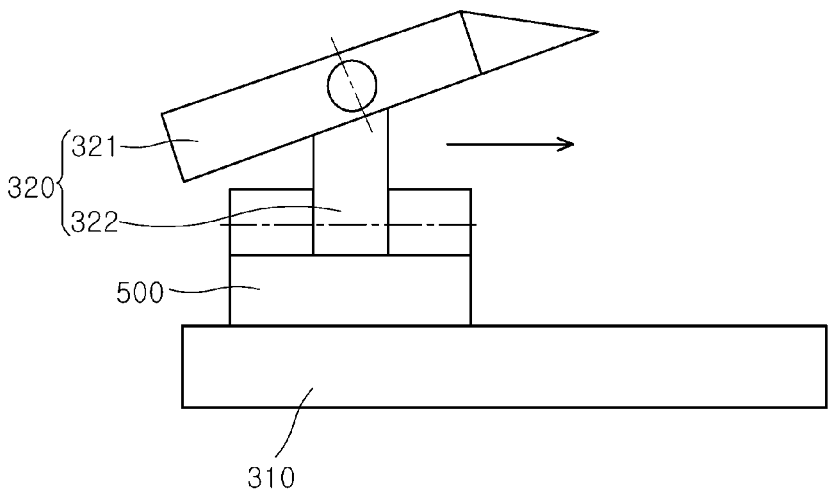
FIG. 5 is a schematic view of a cushioning part of the container transportation system according to the present invention.

FIG. 5 is a schematic view of a cushioning part 500 of the container transportation system according to the present invention.

The cushioning part 500 is disposed between the upper surface of the transport vehicle body 310 and the container coupling part 320 to provide cushioning action. Specifically, the cushioning part 500 is disposed between a docking body support 322 described below and the transport vehicle body 310 to provide cushioning between the transport vehicle 300 and the container 200 during coupling of the transport vehicle 300 to the container 200 or during travelling of the transport vehicle 300, thereby ensuring vibration reduction and docking stability.

Figure 6:
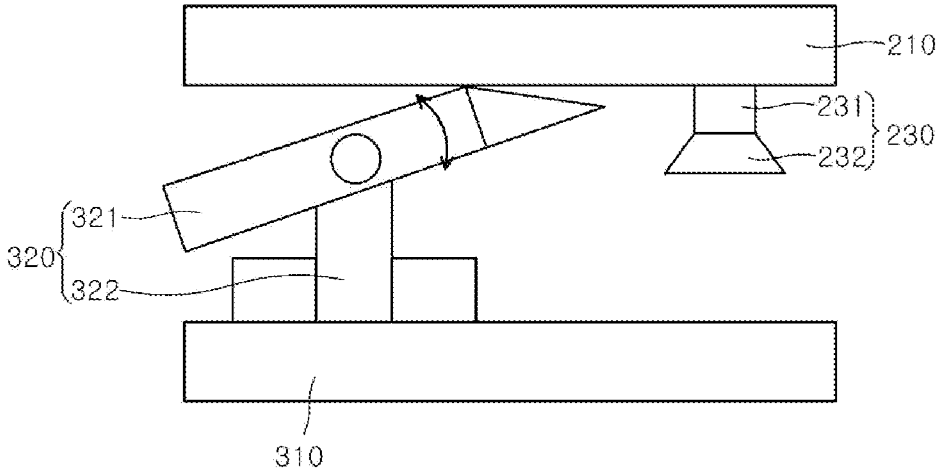
FIG. 6 is a view of an exemplary container coupling part of the container transportation system according to the present invention.
Figure 6:
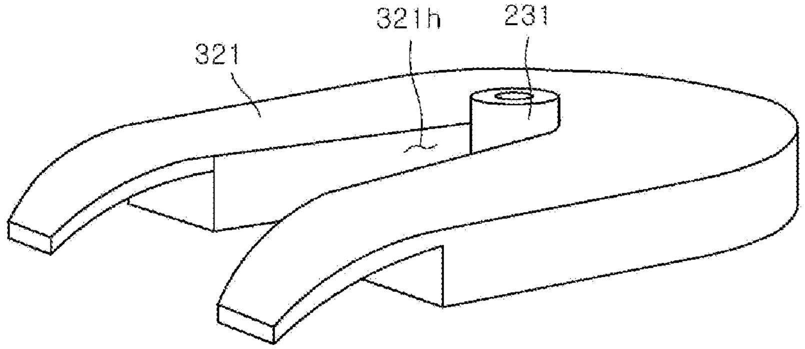

FIG. 6 illustrates an example of the container coupling part 320 of the container transportation system according to the present invention. Specifically, the container coupling part 320 includes a docking body 321 and a docking body support 322.

The docking body 321 has a "U" shape and is formed in a central region thereof with a docking hole 321*h* adapted for the vehicle coupling part 230 to be inserted thereinto and coupled thereto.

The docking body support 322 is coupled to the upper surface of the transport vehicle body 310 to couple the transport vehicle body 310 to the docking body 321. Here, the docking body 321 may be rotatably coupled to the docking body support 322.

In addition, an upper surface of the docking body 321 is formed in a curved shape such that the docking body 321 gradually decreases in thickness toward an end thereof, thereby further facilitating vertical alignment of the docking body 321 during coupling of the transport vehicle 300 to the container 200.

Figure 7:
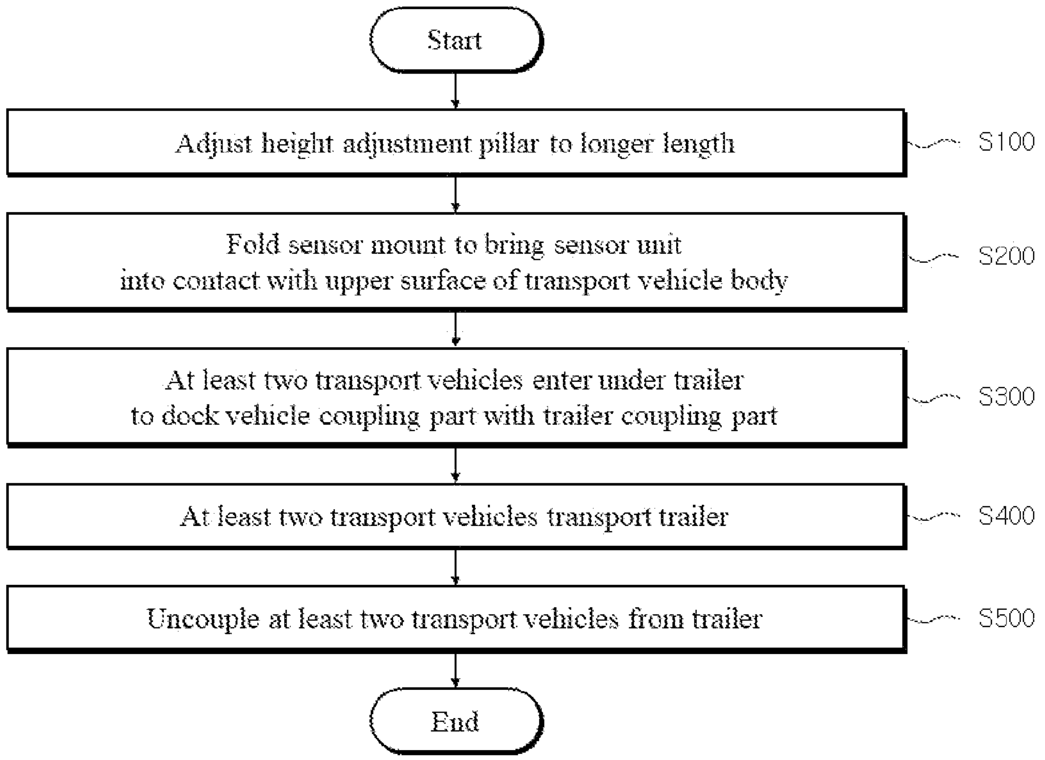
FIG. 7 is a flow diagram of a container transportation method according to the present invention.

FIG. 7 is a flow diagram of a container transportation method according to the present invention. In the following, the container transportation method using the container transportation system according to the present invention described above with reference to FIG. 1 to FIG. 6 will be described.

The container transportation method according to the present invention includes a container lifting step S100, a sensor mount folding step S200, a docking step S300, a transport step S400, and an undocking step S500.

In the container lifting step S100, the container 200 is lifted from the ground by adjusting the height adjustment pillar 220 to a longer length.

In the sensor mount folding step S200, the sensor mount 400*a* is folded such that the sensor unit 440*a* (corresponding to the sensor array 410*b*) is brought into contact with the upper surface of the transport vehicle body 310 by driving the motor 450*a* to move the folding portion 420*a* or the lead screw 440*b*.

In the docking step S300, the at least two transport vehicles 300 enter under the container 200 and the vehicle coupling part 230 is docked with the container coupling part 320, whereby the multiple transport vehicles 300 are coupled to the container. Various embodiments of the docking step S300 will be described further below.

In order to ensure that the transport vehicle 300 is coupled to the container 200 in the docking step S300, after the at least two transport vehicles 300 enter under the container 200, the height adjustment pillar 220 is adjusted to a shorter length to allow the vehicle coupling part 230 to be aligned with the container coupling part 320 such that the container coupling part 320 can be docked with the vehicle coupling part 230.

In addition, after the transport vehicle 300 is coupled to the container 200, the height adjustment pillar 220 is adjusted to a further shorter length or is fully inserted into the container body 210 to prevent the height adjustment pillar from being interfered with by roads and external structures when the transport vehicle 300 transports the container 200 in the transport step S400 described below, thereby ensuring smooth transport of the container 200 by the transport vehicle 300.

In the transport step S400, the at least two transport vehicles 300 transport the container 200.

In the undocking step S500, the at least two transport vehicles 300 are undocked from the container 200 and exit from under the container 200.

Thereafter, the sensor mount 400*a* folded in the sensor mount folding step S200 is unfolded again to allow the sensor unit 440*a* (corresponding to the sensor array 410*b*) to sense a travel route of the transport vehicle 300 so as to ensure smooth travelling of the transport vehicle 300.

Since other details of the container transportation method according to the present invention are the same as described in the container transportation system according to the present invention, description thereof will be omitted.

Figure 8:
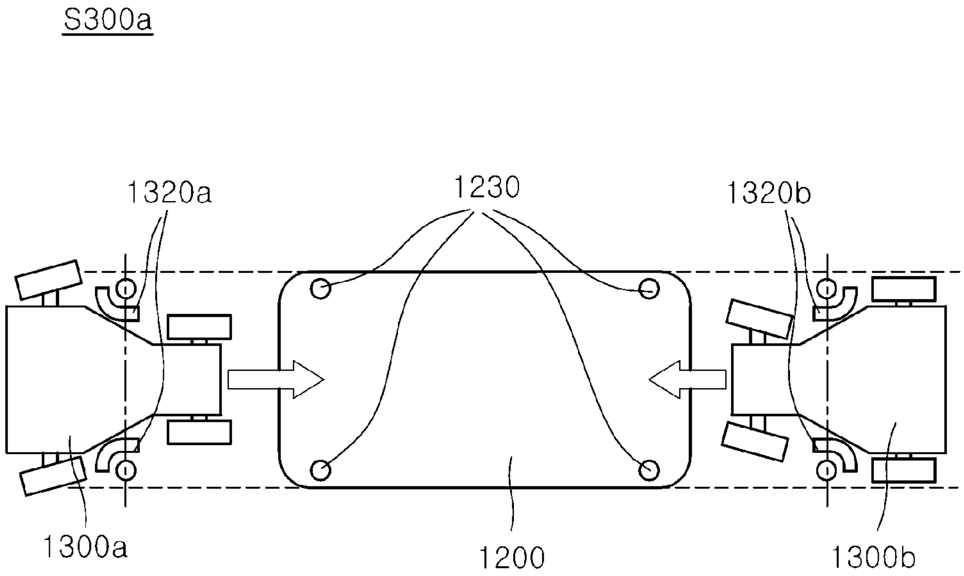
FIG. 8 is a view of a first embodiment of a docking step of the container transportation method according to the present invention.

FIG. 8 illustrates a first embodiment S300*a* of the docking step of the container transportation method according to the present invention.

When the transport vehicle includes two transport vehicles in the docking step S300, a transport vehicle docked with a front of a container 1200 is referred to as a first transport vehicle 1300*a* and a transport vehicle docked with a rear of the container 1200 is referred to as a second transport vehicle 1300*b*.

The first transport vehicle 1300*a* includes a transport vehicle body having an isosceles trapezoidal shape narrower at a rear side to be docked with the front of the container 1200, and the second transport vehicle 1300*b* includes a transport vehicle body having an isosceles trapezoidal shape narrower at a front side to be docked with the rear of the container 1200.

In the docking step S300*a*, the first transport vehicle 1300*a* enters horizontally under the container 1200 from ahead of the container 1200 with a rear thereof facing the container 1200, and the second transport vehicle 1300*b* enters horizontally under the container 1200 from behind the container 1200 with a front thereof facing the container 1200.

Various embodiments corresponding to the first embodiment S300*a* of the docking step of the container transportation method according to the present invention will be described further below with reference to FIG. 11.

Figure 9:
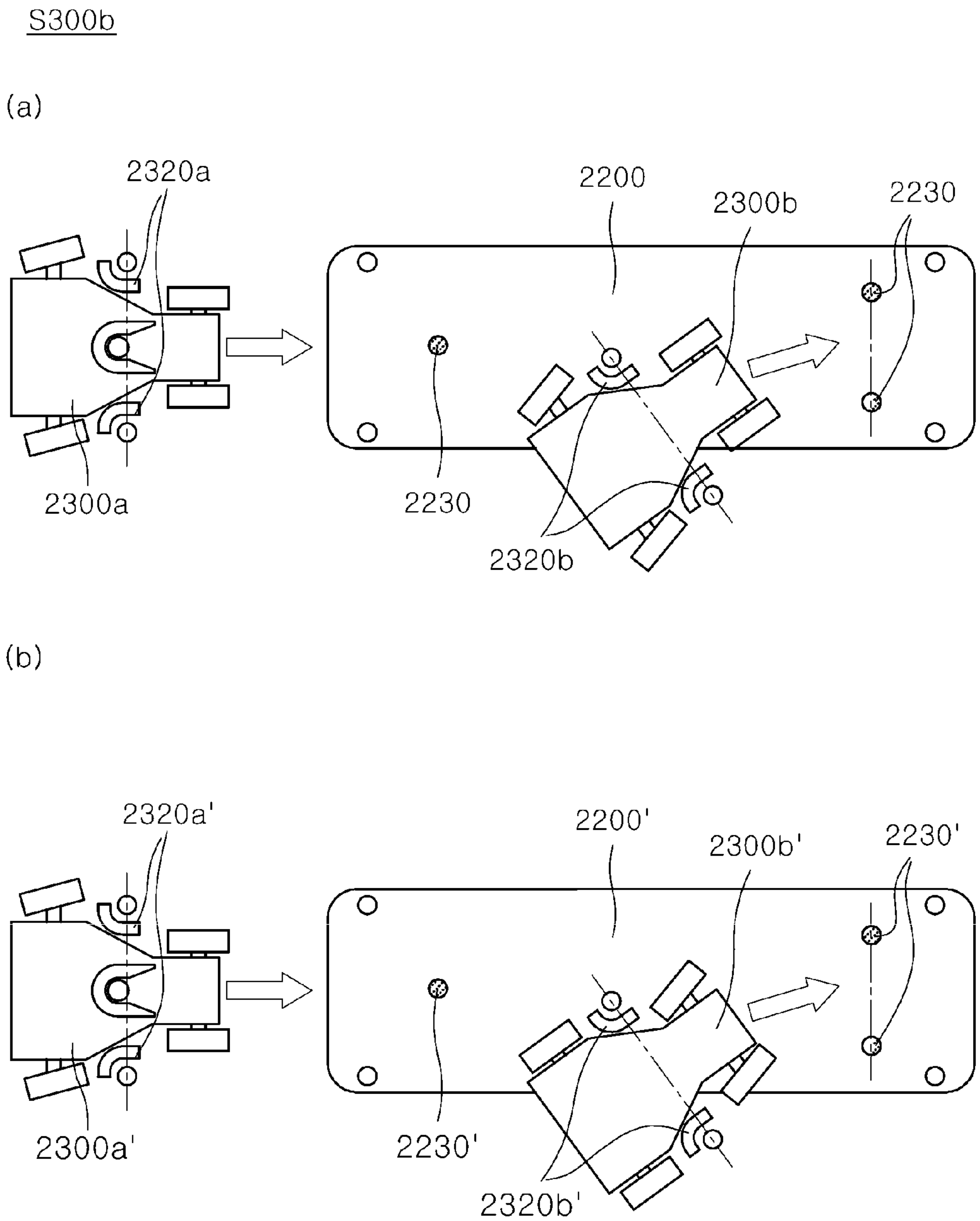
FIG. 9 is a view of a second embodiment of the docking step of the container transportation method according to the present invention.

FIG. 9 illustrates a second embodiment S300*b* of the docking step of the container transportation method according to the present invention.

When the transport vehicle includes two transport vehicles in the docking step S300*b*, a transport vehicle docked with a front of a container 2200 is referred to as a first transport vehicle 2300*a* and a transport vehicle docked with a rear of the container 2200 is referred to as a second transport vehicle 2300*b*.

Referring to FIG. 9(*a*), the first transport vehicle 2300*a* includes a transport vehicle body having an isosceles trapezoidal shape narrower at a rear side to be docked with the container 2200 by entering under the container 2200 from ahead of the container 2200 with a rear thereof facing the container 2200, and the second transport vehicle 2300*b* includes a transport vehicle body having an isosceles trapezoidal shape wider at a front side to be docked with the container 2200 by entering under the container 2200 from aside the container 2200 with a rear thereof facing the container 2200.

That is, the transport vehicle body of the first transport vehicle 2300*a* has an isosceles trapezoidal shape narrower at the rear side such that the first transport vehicle 2300*a* is docked with the container 2200 by entering horizontally under the container 2200 from ahead of the container 2200 with the rear thereof facing the container 2200, and the transport vehicle body of the second transport vehicle 2300*b* docked with the rear of the container 2200 also has an isosceles trapezoidal shape wider at the front side. In this case, since the second transport vehicle 2300*b* cannot enter under the container 2200 from behind the container 2200 with the front thereof facing the container 2200, the second transport vehicle 2300*b* may be horizontally docked with the container 2200 by entering under the container 2200 from aside the container 2200 with the rear thereof facing the container 2200.

Alternatively, referring to FIG. 9(*b*), a transport vehicle body of a second transport vehicle 2300*b*' may have an isosceles trapezoidal shape wider at a rear side. In this case, a first transport vehicle 2300*a*' may enter under a container 2200' from ahead of the container 2200' with a front thereof facing the container 2200', and the second transport vehicle 2300*b*' may be horizontally docked with the container 2200' by entering under the container 2200' from aside the container 2200' with a front thereof facing the container 2200'.

Accordingly, regardless of whether the vehicle has a shape wider at a front side or a shape wider at a rear side, the vehicle can enter under the container 2200.

Figure 10:
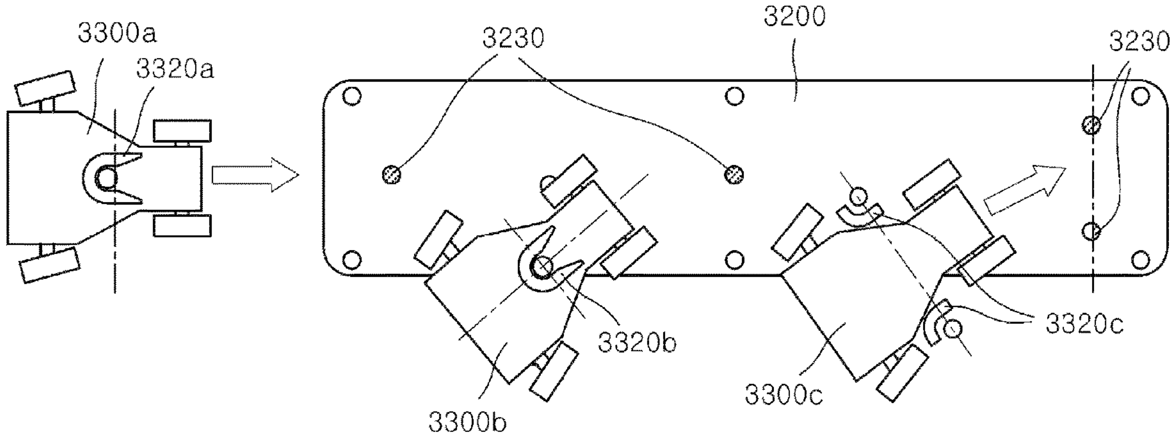
FIG. 10 is a view of a third embodiment of the docking step of the container transportation method according to the present invention.

FIG. 10 illustrates a third embodiment S300*c* of the docking step of the container transportation method according to the present invention.

When the transport vehicle includes three transport vehicles in the docking step S300*c*, a transport vehicle docked with a front of a container 3200 is referred to as a first transport vehicle 3300*a*, a transport vehicle docked with a center of the container 3200 is referred to as a second transport vehicle 3300*a*, and a transport vehicle docked with a rear of the container 3200 is referred to as a third transport vehicle 3300*a*.

The first transport vehicle 3300*a* includes a transport vehicle body having an isosceles trapezoidal shape narrower at a rear side to be docked with the container 3200 by entering under the container 3200 from ahead of the container 2200 with a rear thereof facing the container 3200, and the second transport vehicle 3300*b* and the third transport vehicle 3300*c* each include a transport vehicle body having an isosceles trapezoidal shape wider at a front side.

In the docking step S300*c*, the second transport vehicle 3300*b* and the third transport vehicle 3300*c* are horizontally docked with the container 3200 by entering under the container 3200 from aside the container 3200 with a rear thereof facing the container 3200.

That is, the transport vehicle body of the first transport vehicle 3300*a* has an isosceles trapezoidal shape narrower at the rear side such that the first transport vehicle 3300*a* is docked with the container 3200 by entering horizontally under the container 3200 from ahead of the container 2200 with the rear thereof facing the container 2200; and the respective vehicle bodies of the second transport vehicle 3300*b* and the third transport vehicle 3300*c* docked with the center and rear of the container 3200 also have an isosceles trapezoidal shape wider at the front side. In this case, since the second transport vehicle 3300*b* and the third transport vehicle 3300*c* cannot enter under the container 3200 from ahead of (or behind) the container 2200 with the rear (or front) thereof facing the container 3200, the second transport vehicle 3300*b* and the third transport vehicle 3300*c* may be horizontally docked with the container 3200 by entering under the container 3200 from aside the container 3200 with the rear thereof facing the container 3200.

Figure 11:
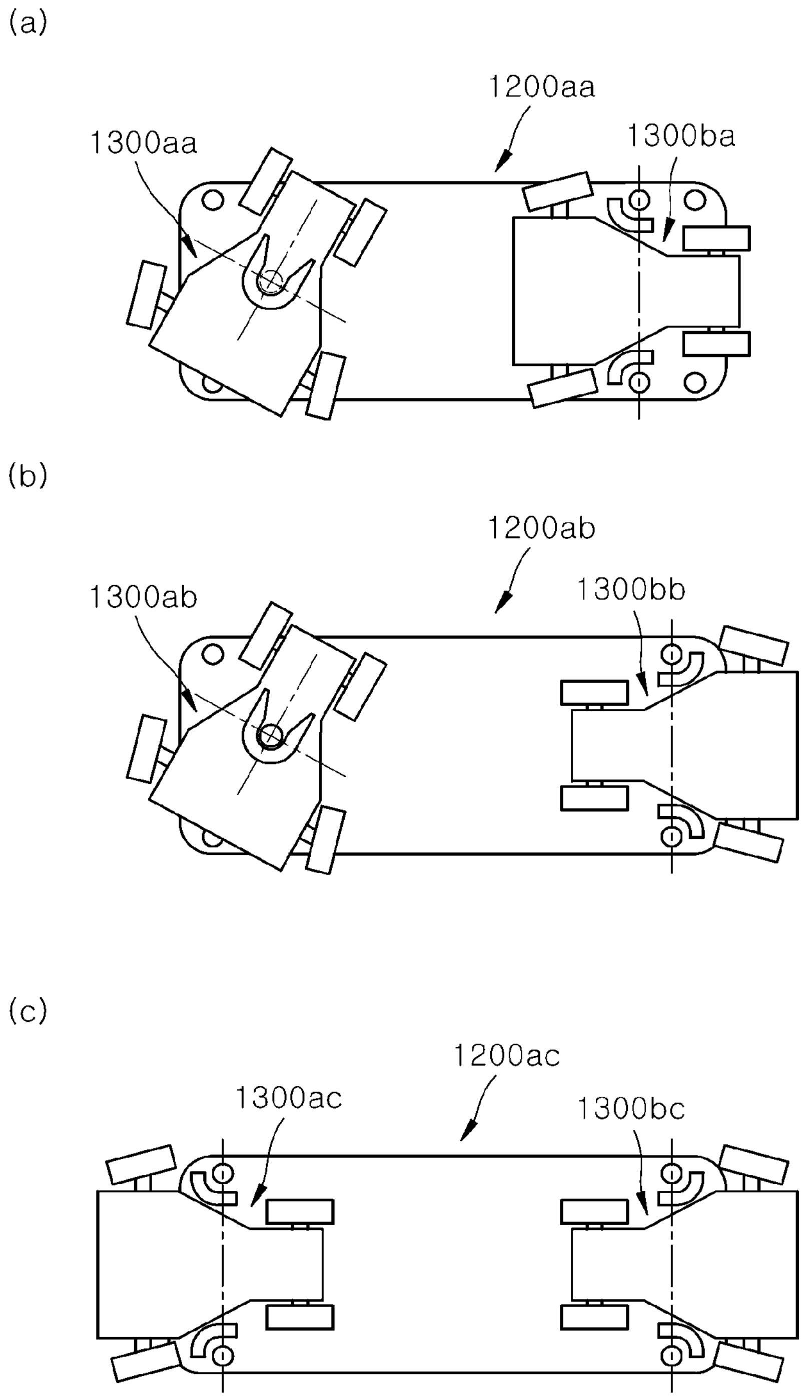
FIG. 11 illustrates various embodiments corresponding to the first embodiment of the docking step shown in FIG. 8.

FIG. 11 illustrates various embodiments corresponding to the first embodiment of the docking step S300 shown in FIG. 8.

Referring to FIG. 11(*a*), a first transport vehicle 1300*aa* may be wider at a front thereof to be docked with a container 1200*aa* by entering under the container 1200*aa* from ahead of the container 1200*aa* with a rear thereof facing the container 1200*aa*, and a second transport vehicle 1300*ba* may be wider at a front thereof to be docked with the container 1200*aa* by entering under the container 1200*aa* from aside the container 1200*aa* with a rear thereof facing the container 1200*aa*.

Alternatively, referring to FIG. 11(*b*), a first transport vehicle 1300*ab* may be wider at a front thereof to be docked with a container 1200*ab* by entering under the container 1200*ab* from ahead of the container 1200*ab* with a rear thereof facing the container 1200*ab*, and a second transport vehicle 1300*bb* may be wider at a front thereof to be docked with the container 1200*ab* by entering under the container 1200*ab* from behind the container 1200*ab* with a rear thereof facing the container 1200*ab*. Here, the vehicle having a shape wider at the front will have a smaller turning radius when turning during transport.

Alternatively, referring to FIG. 11(*c*), a first transport vehicle 1300*ac* and a second transport vehicle 1300*bc* each having a shape wider at a front thereof may be docked with a container 1200*ac* by entering under the container 1200*ac* from ahead of and behind the container 1200*ac*, respectively, with a rear thereof facing the container 1200*ac* before transporting the container 1200*ac*.

Figure 12:
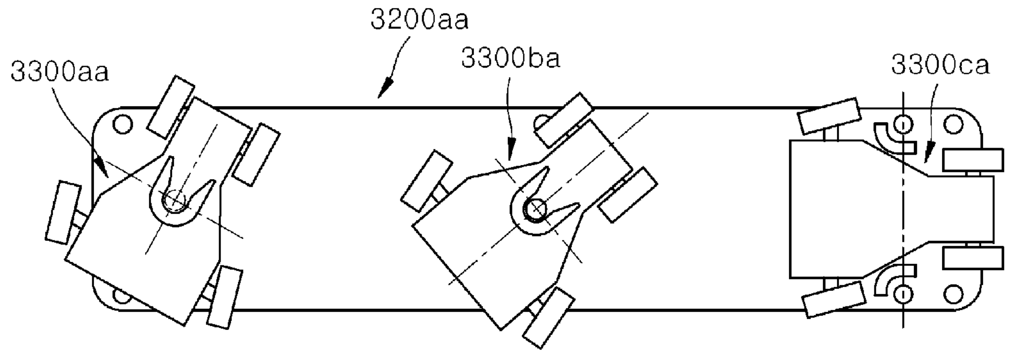
FIG. 12 illustrates various embodiments corresponding to the third embodiment of the docking step shown in FIG. 10.
Figure 12:
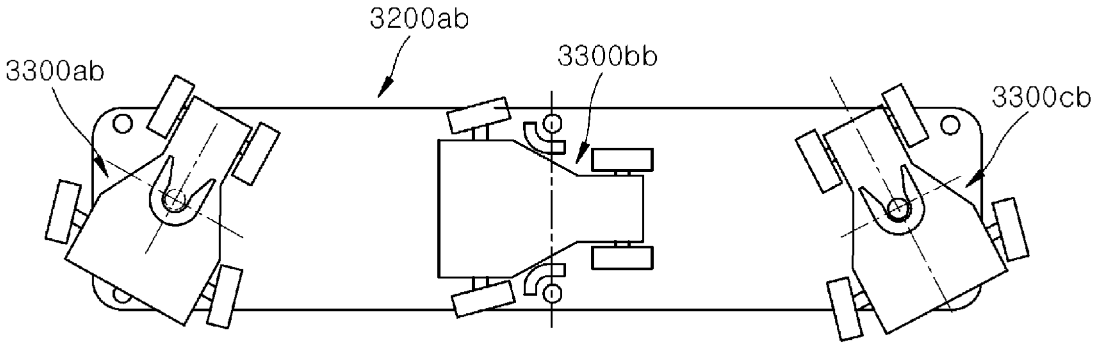

FIG. 12 illustrates various embodiments corresponding to the third embodiment S300*c* of the docking step shown in FIG. 10.

Referring to FIG. 12(*a*), a first transport vehicle 3300*aa* has a shape wider at a front thereof to be docked with a container 3200*aa* by entering under the container 3200*aa* from ahead of the container 3200*aa* with a rear thereof facing the container 3200*aa*; a second transport vehicle 3300*ba* has a shape wider at a front thereof to be horizontally docked with a central region of the container 3200*aa* by entering under the container 3200*aa* from aside the container 3200*aa* with a rear thereof facing the container 3200*aa*; and a third transport vehicle 3300*ca* has a shape wider at a front thereof to be horizontally docked with a rear of the container 3200*aa* by entering under the container 3200*aa* from aside the container 3200*aa* with a rear thereof facing the container 3200*aa*.

Alternatively, referring to FIG. 12(*b*), a first transport vehicle 3300*ab* has a shape wider at a front thereof to be docked with a container 3200*ab* by entering under the container 3200*ab* from ahead of the container 3200*ab* with a rear thereof facing the container 3200*ab*; a second transport vehicle 3300*bb* has a shape wider at a front thereof to be horizontally docked with a central region of the container 3200*ab* by entering under the container 3200*ab* from aside the container 3200*ab* with a rear thereof facing the container 3200*ab*; and a third transport vehicle 3300*cb* has a shape wider a front thereof to be horizontally docked with the container 3200*ab* by entering under the container 3200*ab* from behind the container 3200*ab* with a rear thereof facing the container 3200*ab*. Here, the steering vehicle having a shape wider at the front thereof will have a smaller turning radius when turning during transport.

Although some embodiments have been described herein, it should be understood that these embodiments are provided for illustration only and are not to be construed in any way as limiting the invention, and that various modifications, changes, alterations, and equivalent embodiments can be made by those skilled in the art without departing from the spirit and scope of the invention. In addition, it should be understood that such modifications are not to be understood as being separate from the technical idea or prospect of the invention.

The container transportation system using autonomous driving and the container transportation method using autonomous driving according to the present invention may be applied to a container transportation system that enables fast delivery of goods by reducing a time for coupling a transportation vehicle to a container using autonomous driving technology in which an autonomous vehicle automatically docks with a container and autonomously travels to transport the container to a transport destination.

The invention claimed is:

1. A container transportation system using autonomous driving, comprising:

a container to be transported;

at least two transport vehicles configured to be docked with or undocked from the container and to transport the container; and a management server controlling travelling of the at least two transport vehicles, wherein each of the at least two transport vehicles comprises:

a transport vehicle body having an isosceles trapezoidal shape, the transport vehicle body having a first end and a second end opposite to the first end along a frontal direction of the transport vehicle body, a width of the first end in a lateral direction being narrower than a width of the second end in the lateral direction, the isosceles trapezoidal shape being defined by the first end, the second end, and two non-parallel sides of equal length connecting the first end and the second end; and a container coupling part formed at an upper portion of the transport vehicle body and coupled to the container, wherein each of the at least two transport vehicles is configured to enter under the container with the first end of the transport vehicle body facing the container, and the container comprises:

a container body;

a plurality of height adjustment pillars coupled to respective corners of a lower surface of the container body, the plurality of height adjustment pillars being adjustable in length to lift or lower the container body from or to the ground and configured to be fully inserted into the container body; and a vehicle coupling part formed on the lower surface of the container body and coupled to the container coupling part.

2. A container transportation method using the container transportation system according to claim 1, comprising:

a container lifting step in which the container is lifted from the ground by adjusting the plurality of height adjustment pillars to a longer length;

a docking step in which each of the at least two transport vehicles enters under the container with the first end of the transport vehicle body facing the container and is coupled to the container;

a transport step in which the at least two transport vehicles transport the container; and an undocking step in which the at least two transport vehicles are uncoupled from the container and exit from under the container.

3. The container transportation method according to claim 2, wherein, in the docking step, after each of the at least two transport vehicles enters under the container with the first end of the transport vehicle body facing the container, the plurality of height adjustment pillars are adjusted to a shorter length to align the vehicle coupling part with the container coupling part, and after the at least two transport vehicles are coupled to the container, the plurality of height adjustment pillars are fully inserted into the container body.

4. A container transportation method using the container transportation system according to claim 1, comprising:

a container lifting step in which the container is lifted from the ground by adjusting the plurality of height adjustment pillars to a longer length;

a docking step in which each of the at least two transport vehicles enters under the container with the first end of the transport vehicle body facing the container and is coupled to the container, and after the at least two transport vehicles are coupled to the container, the plurality of height adjustment pillars are fully inserted into the container body;

a transport step in which the at least two transport vehicles transport the container; and an undocking step in which the at least two transport vehicles are uncoupled from the container and exit from under the container.

5. The container transportation method according to claim 4, wherein, in the docking step, after each of the at least two transport vehicles enters under the container with the first end of the transport vehicle body facing the container, the plurality of height adjustment pillars are adjusted to a shorter length to align the vehicle coupling part with the container coupling part of each of the at least two transport vehicles.

* * * * *